US012747328B2

(12) United States Patent
Oda et al.

(10) Patent No.: US 12,747,328 B2
(45) Date of Patent: Sep. 29, 2026

(54) THERMOPLASTIC RESIN PREPREG AND METHOD FOR MANUFACTURING SAME

(71) Applicant: TEIJIN LIMITED, Osaka (JP)

(72) Inventors: Akimichi Oda, Osaka (JP); Takaya Suzuki, Osaka (JP); Takuro Kobayashi, Osaka (JP)

(73) Assignee: TEIJIN LIMITED, Osaka (JP)

( * ) Notice: Subject to any disclaimer, the term of this patent is extended or adjusted under 35 U.S.C. 154(b) by 139 days.

(21) Appl. No.: 18/294,380

(22) PCT Filed: Jul. 28, 2022

(86) PCT No.: PCT/JP2022/029212
§ 371 (c)(1),
(2) Date: Feb. 1, 2024

(87) PCT Pub. No.: WO2023/013527
PCT Pub. Date: Feb. 9, 2023

(65) Prior Publication Data

US 2024/0343871 A1 Oct. 17, 2024

(30) Foreign Application Priority Data

Aug. 2, 2021 (JP) ................................ 2021-127020

(51) Int. Cl.
*C08J 5/24* (2006.01)

(52) U.S. Cl.
CPC ........... *C08J 5/243* (2021.05); *C08J 2371/00* (2013.01)

(58) Field of Classification Search
CPC .... C08J 2371/00; C08J 2371/10; C08J 5/243; C08J 5/04; C08J 5/042; B29C 70/50; B29B 15/12
USPC ...................................................... 428/299.1
See application file for complete search history.

(56) References Cited

U.S. PATENT DOCUMENTS

| | | | |
|---|---|---|---|
| 5,066,536 A | 11/1991 | Cogswell et al. | |
| 5,110,681 A | 5/1992 | Satake et al. | |
| 5,201,979 A | 4/1993 | Koba et al. | |
| 5,844,036 A | 12/1998 | Hughes | |
| 2014/0154472 A1 | 6/2014 | Eto et al. | |
| 2014/0155540 A1 | 6/2014 | Imai et al. | |
| 2018/0162101 A1 | 6/2018 | Stickler et al. | |
| 2018/0162102 A1 | 6/2018 | Stickler et al. | |
| 2018/0162103 A1 | 6/2018 | Stickler | |
| 2018/0346668 A1* | 12/2018 | Ichikawa | D06M 13/148 |
| 2018/0362760 A1 | 12/2018 | Imai et al. | |
| 2019/0292336 A1 | 9/2019 | Humfeld et al. | |
| 2021/0108042 A1 | 4/2021 | Hayashi et al. | |
| 2021/0268772 A1 | 9/2021 | Stickler et al. | |
| 2021/0323274 A1 | 10/2021 | Stickler et al. | |
| 2022/0161522 A1 | 5/2022 | Stickler | |
| 2022/0195134 A1 | 6/2022 | Oda et al. | |
| 2022/0325054 A1 | 10/2022 | Hasuike et al. | |
| 2022/0325056 A1 | 10/2022 | Hasuike et al. | |
| 2022/0325057 A1 | 10/2022 | Hasuike et al. | |

FOREIGN PATENT DOCUMENTS

| | | |
|---|---|---|
| CN | 112590252 A | 4/2021 |
| JP | 1-198635 A | 8/1989 |
| JP | 2-1303 A | 1/1990 |
| JP | H2-48907 A | 2/1990 |
| JP | 2-191635 A | 7/1990 |
| JP | 4-175114 A | 6/1992 |
| JP | 5-285948 A | 11/1993 |
| JP | 11-507693 A | 7/1999 |
| JP | 2013-006961 A | 1/2013 |
| JP | 2018-103617 A | 7/2018 |
| JP | 2018-138383 A | 9/2018 |
| JP | 2021-107536 A | 7/2021 |
| JP | 2021-107538 A | 7/2021 |
| WO | 2020/213406 A1 | 10/2010 |
| WO | 2012/176788 A1 | 12/2012 |
| WO | 2013/008720 A1 | 1/2013 |
| WO | 2020004638 A1 | 1/2020 |
| WO | 2021/008983 A1 | 1/2021 |
| WO | 2021/132416 A1 | 7/2021 |

OTHER PUBLICATIONS

International Search Report dated Oct. 11, 2022 in International Application No. PCT/JP2022/029212.

* cited by examiner

*Primary Examiner* — Camie S Thompson
(74) *Attorney, Agent, or Firm* — Sughrue Mion, PLLC

(57) ABSTRACT

Provided is a thermoplastic resin prepreg comprising a fiber-reinforced substrate and a thermoplastic resin composition partially or completely impregnated in the fiber-reinforced substrate, the thermoplastic resin prepreg being characterized in that the thermoplastic resin composition contains at least 50 [mass %] of polyether ether ketone among all the thermoplastic resins contained in the thermoplastic resin composition, and the sum of the crystallinity $W_C$ [%] of the thermoplastic resin composition and the rigid amorphous component proportion $W_{RAP}$ [%] in the thermoplastic resin composition is in the range of 51 to 100 [%].

13 Claims, No Drawings

THERMOPLASTIC RESIN PREPREG AND METHOD FOR MANUFACTURING SAME

CROSS REFERENCE TO RELATED APPLICATIONS

This application is a National Stage of International Application No. PCT/JP2022/029212 filed on Jul. 28, 2022, claiming priority based on Japanese Patent Application No. 2021-127020 filed on Aug. 2, 2021.

TECHNICAL FIELD

The present invention relates to a thermoplastic resin prepreg and a method for manufacturing the same. More specifically, the present invention relates to a thermoplastic resin prepreg having high surface smoothness and high thermal processability during heat molding, and a method for manufacturing the same.

BACKGROUND ART

A fiber-reinforced composite material made of a reinforcing fiber and a resin has features such as light weight, high strength, and high elastic modulus, and is widely applied to aircraft, sports and leisure, and general industries. This fiber-reinforced composite material is often manufactured via a prepreg in which a reinforcing fiber and a resin called a matrix resin are integrated in advance.

Conventionally, thermosetting resins such as an unsaturated polyester resin, an epoxy resin, and a polyimide resin are mainly used as a matrix resin in the aerospace field, industrial field, and the like where high mechanical properties, heat resistance, and the like are required. However, these thermosetting resins have disadvantages of being brittle and having poor impact resistance. Therefore, in particular, in the aerospace field, use of a thermoplastic resin as a matrix resin has been studied from the viewpoint of impact resistance of a composite material to be obtained and molding cost.

Among thermoplastic resins, polyaryletherketones (PAEK) such as polyether ether ketone (PEEK) and polyetherketoneketone (PEKK) have excellent heat resistance, chemical resistance, and mechanical strength, and therefore are expected in the aerospace field.

However, when a prepreg is produced using such a thermoplastic resin having a high melting point, irregularities are generated on the surface of the prepreg, and the surface smoothness may not be sufficiently high. When the prepreg is thermally processed at a high temperature, deformation or wrinkles may occur.

Patent Literature 1 discloses a method for manufacturing a prepreg including a thin layer of a hot-melt adhesive on a surface of the prepreg in order to improve difficulty in lamination caused by relatively incomplete uniformity and hardness of a surface of a composite material. This provides a technique for manufacturing prepregs that can be bonded to each other by applying sufficient heat and pressure.

Patent Literature 2 discloses a thermoplastic resin prepreg, in which the adhesiveness of the surface of the prepreg is efficiently improved without causing deterioration in mechanical properties due to the type of the matrix resin itself of the thermoplastic resin prepreg when thermoplastic resin prepregs are laminated or insert (or outsert) molding is performed using a thermoplastic prepreg, and desirable adhesiveness during molding of a pre-molded body and/or a composite molded body using the thermoplastic resin prepreg can be ensured, a pre-molded body and a composite molded body obtained using the thermoplastic resin prepreg, and methods for manufacturing the same.

In view of this problem, a method of applying a resin to a thermoplastic resin prepreg does not lead to elimination of nonuniformity of the prepreg during molding, and therefore residual stress cannot be removed during molding, and the method is insufficient for preventing deformation and wrinkles.

CITATION LIST

Patent Literature

Patent Literature 1: JP H02-1303 A
Patent Literature 2: WO 2013/008720 A

SUMMARY OF INVENTION

Technical Problem

An object of the present invention is to provide a prepreg in which surface smoothness of the prepreg itself is high and deformation and wrinkles during thermal processing are less likely to occur, and to provide a method for manufacturing the prepreg.

Solution to Problem

The present inventor considered that the cause of wrinkles occurring during thermal processing is internal stress remaining in the prepreg or the phase state of the matrix resin. Then, the relaxation of such internal stress and the phase state of the matrix resin were examined. As a result, the present inventor found that the above-described object can be achieved by setting the rigid component proportion [%], which is the sum of the crystallinity $W_C$ [%] of the matrix resin and the rigid amorphous component proportion $W_{RAP}$ [%], within a predetermined range. Then, the present inventor found that such adjustment of the rigid component proportion [%] can be achieved by controlling the formulation of the resin composition included in the prepreg and the surface pressure and/or temperature conditions during manufacturing of the prepreg, and completed the present invention.

The present invention for achieving the above-described object includes those described below.

[1] A thermoplastic resin prepreg including a fiber-reinforced substrate and a thermoplastic resin composition partially or completely impregnated into the fiber-reinforced substrate, wherein

- the thermoplastic resin composition contains 50 [mass %] or more of polyether ether ketone among all thermoplastic resins contained in the thermoplastic resin composition, and
- a sum of a crystallinity $W_C$ [%] of the thermoplastic resin composition and a rigid amorphous component proportion $W_{RAP}$ [%] in the thermoplastic resin composition is in a range of 51 to 100 [%].

[2] The thermoplastic resin prepreg according to [1], wherein the crystallinity $W_C$ is 20 to 50 [%].

[3] The thermoplastic resin prepreg according to [1], wherein the rigid amorphous component proportion $W_{RAP}$ is 25 to 80 [%].

[4] The thermoplastic resin prepreg according to [1], wherein a void fraction in a laminate test is 9.5 [area %] or less.

[5] The thermoplastic resin prepreg according to [1], wherein the fiber-reinforced substrate includes a carbon fiber.

[6] A method for manufacturing a thermoplastic resin prepreg, which includes a fiber-reinforced substrate and a thermoplastic resin composition containing a crystalline thermoplastic resin, and in which the thermoplastic resin composition is partially or completely impregnated into the fiber-reinforced substrate, the method including a step of heating at a heat treatment temperature equal to or higher than a glass transition temperature of the thermoplastic resin composition and then cooling to the glass transition temperature or lower in a state in which the thermoplastic resin composition is impregnated into the fiber-reinforced substrate or when the thermoplastic resin composition is impregnated into the fiber-reinforced substrate, wherein an average cooling rate during the cooling satisfies Condition (A) or (B) below.

Condition (A): In a case of (the heat treatment temperature)<(the glass transition temperature+150 [° C.]), the average cooling rate from the heat treatment temperature to the glass transition temperature is 80 [° C./sec] or less.

Condition (B): In a case of (the heat treatment temperature)>(the glass transition temperature+150 [° C.]), the average cooling rate from (the glass transition temperature+150 [° C.]) to the glass transition temperature is 80 [° C./sec] or less.

[7] The method for manufacturing a thermoplastic resin prepreg according to [6], wherein the heat treatment temperature is equal to or higher than a melting point of the crystalline thermoplastic resin.

[8] The method for manufacturing a thermoplastic resin prepreg according to [6] or [7], wherein heating under pressure and cooling under pressure are performed at a surface pressure of 0.1 to 10 [MPa] during the heating and during the cooling.

[9] The method for manufacturing a thermoplastic resin prepreg according to [8], wherein the heating under pressure and the cooling under pressure are performed using a double belt press device.

[10] The method for manufacturing a thermoplastic resin prepreg according to any one of [6] to [9], wherein the crystalline thermoplastic resin is polyether ether ketone.

[11] The method for manufacturing a thermoplastic resin prepreg according to any one of [6] to [10], wherein the fiber-reinforced substrate includes a carbon fiber.

Advantageous Effects of Invention

The thermoplastic resin prepreg of the present invention has high surface smoothness before heat molding, and deformation and wrinkles are less likely to occur during thermal processing. In addition, when a plurality of thermoplastic resin prepregs of the present invention are laminated and molded, voids are less likely to occur between layers or the like. Therefore, the moldability of the fiber-reinforced composite material can be improved.

DESCRIPTION OF EMBODIMENTS

Hereinafter, the present invention will be described in detail.

In the present description, the prepreg is a type of fiber-reinforced composite material, but particularly refers to a material in a state before being formed into a fiber-reinforced composite material having an intended shape. In the present description, the fiber-reinforced composite material refers to a material after being molded into an intended shape.

1. Thermoplastic Resin Prepreg

The thermoplastic resin prepreg of the present invention includes a fiber-reinforced substrate and a thermoplastic resin composition partially or completely impregnated into the fiber-reinforced substrate.

The thermoplastic resin composition included in the thermoplastic resin prepreg of the present invention contains 50 [mass %] or more of polyether ether ketone, and a sum of a crystallinity $W_C$ [%] of the thermoplastic resin composition and a rigid amorphous component proportion $W_{RAP}$ [%] in the thermoplastic resin composition in a state of the thermoplastic resin prepreg (rigid component proportion) is in a range of 51 to 100 [%].

A crystalline thermoplastic resin includes a crystalline region and an amorphous region, and the amorphous region can be further divided into a rigid amorphous region (rigid amorphous phase: RAP) and a complete (mobile) amorphous (MA) region. Therefore, the crystalline thermoplastic resin can be described by a phase model including three phases of a crystalline region, a rigid amorphous region, and a complete (mobile) amorphous region. The rigid amorphous region is an intermediate region between the crystalline region and the complete amorphous region, and refers to a region in which molecular motion is frozen even at a glass transition temperature Tg or higher. In the present invention, the thermoplastic resin composition included in the prepreg is considered as a model including the three phases, and the sum of the crystallinity $W_C$[%] indicating the proportion of the crystalline region and the rigid amorphous component proportion $W_{RAP}$ [%] indicating the proportion of the rigid amorphous region is defined as the rigid component proportion.

The rigid amorphous component proportion $W_{RAP}$ [%] is a value obtained by subtracting the crystallinity $W_C$ [%] and a complete amorphous component proportion $W_{MA}$ [%] from 100 [%], and can be defined by the following mathematical formula (1).

$$W_{RAP}=100-W_C-W_{MA} \qquad \text{Mathematical formula (1)}$$

The complete amorphous component proportion $W_{MA}$ [%] is a value obtained by dividing $\Delta Cp$, which is the amount of change in heat capacity of the entire thermoplastic resin composition at the glass transition temperature, by $\Delta Cp_{100}$, which is the amount of change in heat capacity when the thermoplastic resin composition is 100% completely amorphous, and is represented by the following mathematical formula (2).

$$W_{MA}=100\times \Delta Cp/\Delta Cp_{100} \qquad \text{Mathematical formula (2)}$$

In the present invention, the crystallinity $W_C$ is determined by wide angle X-ray diffractometry using a method described later.

In the thermoplastic resin prepreg of the present invention, the rigid component proportion, which is the sum of the rigid amorphous component proportion $W_{RAP}$ and the crystallinity $W_C$ of the thermoplastic resin composition in a state of the thermoplastic resin prepreg, is 51 to 100 [%], preferably 53 to 95 [%], more preferably 53 to 91 [%], and particularly preferably 80 to 91 [%]. By setting the rigid component proportion within this range, wrinkles are less likely to occur during thermal processing, and voids are less likely to occur during lamination of prepregs. When the rigid component proportion is too low, wrinkles are likely to occur during thermal processing. The rigid component proportion can be adjusted by the manufacturing conditions of the prepreg described later as well as the formulation of the thermoplastic resin composition.

In the thermoplastic resin prepreg of the present invention, the crystallinity $W_C$ of the thermoplastic resin composition in a state of the thermoplastic resin prepreg is preferably 20 to 50 [%], more preferably 20 to 35 [%], still more preferably 20 to 30 [3], and particularly preferably 20 to 25 [%]. When the crystallinity is too low, wrinkles are likely to occur during thermal processing due to the influence of change in volume by recrystallization of an amorphous portion. When the crystallinity is too high, wrinkles are likely to occur during thermal processing.

In the thermoplastic resin prepreg of the present invention, the rigid amorphous component proportion $W_{RAP}$ of the thermoplastic resin composition in a state of the thermoplastic resin prepreg is preferably 25 to 80 [%], more preferably 25 to 70 [%], still more preferably 35 to 70 [%], and particularly preferably 55 to 70 [%]. When the rigid amorphous component proportion is too low, wrinkles are likely to occur during thermal processing due to the influence of change in volume by recrystallization of a complete amorphous portion. When the rigid amorphous component proportion is too high, wrinkles are likely to occur during thermal processing.

In the thermoplastic resin prepreg of the present invention, the void fraction in a laminate test described later is preferably 9.5 [area %] or less, more preferably 6.5 [area %] or less, still more preferably 4.0 [area %] or less, and particularly preferably 3.0 [area %] or less. As the void fraction is reduced, the physical properties of the resulting fiber-reinforced composite material can be improved. The void fraction is preferably as low as possible, and the lower limit thereof is not particularly limited, but may be generally 0.01 [area %] or more, and may also be 0.1 [area %] or more.

(1) Fiber-Reinforced Substrate

The reinforcing fiber used as a fiber-reinforced substrate of the present invention is not particularly limited, and examples thereof include a carbon fiber, a glass fiber, an aramid fiber, a silicon carbide fiber, a polyester fiber, a ceramic fiber, an alumina fiber, a boron fiber, a metal fiber, a mineral fiber, a rock fiber, and a slug fiber.

Among these reinforcing fibers, a carbon fiber, a glass fiber, and an aramid fiber are preferable. A carbon fiber is more preferable because it has a good specific strength and a good specific modulus and provides a fiber-reinforced composite material which is lightweight and has high strength. A polyacrylonitrile (PAN)-based carbon fiber is particularly preferable because it has an excellent tensile strength.

When a PAN-based carbon fiber is used as the reinforcing fiber, the tensile elastic modulus thereof is preferably 100 to 600 [GPa], more preferably 200 to 500 [GPa], and particularly preferably 230 to 450 [GPa]. The tensile strength is preferably 2,000 to 10,000 [MPa], and more preferably 3,000 to 8,000 [MPa]. The diameter of the carbon fiber is preferably 4 to 20 [μm], and more preferably 5 to 10 [μm]. Use of such a carbon fiber can particularly improve the mechanical properties of the resulting fiber-reinforced composite material.

In the present invention, the fiber-reinforced substrate may be a reinforcing fiber bundle, or may be used as a reinforcing fiber sheet obtained by forming a reinforcing fiber into a sheet. It is more preferable to use a reinforcing fiber sheet obtained by forming a reinforcing fiber into a sheet. Examples of the reinforcing fiber sheet include a sheet (UD sheet) in which a large number of reinforcing fibers are aligned in one direction, a laminated sheet in which a plurality of UD sheets are laminated while the fiber direction is aligned or the fiber direction is changed, a bidirectional woven fabric such as a plain weave or a twill weave, a multiaxial woven fabric, a nonwoven fabric, a mat, a knit, a braid, and a paper obtained by papermaking using a reinforcing fiber. Among these, use of a UD sheet, a laminated sheet, a bidirectional woven fabric, or a multiaxial woven fabric substrate obtained by forming a reinforcing fiber into a sheet as a continuous fiber is preferable because a fiber-reinforced composite material having more excellent mechanical properties can be obtained. The thickness of the sheet-like fiber-reinforced substrate is preferably 0.01 to 3 [mm], and more preferably 0.1 to 1.5 [mm].

The content of the fiber-reinforced substrate in the entire thermoplastic resin prepreg of the present invention is preferably 40 to 85 [mass %], and more preferably 45 to 80 [mass %] based on the total mass of the prepreg. When the fiber content is within this range, a fiber-reinforced composite material having more excellent mechanical properties can be obtained. When the fiber content is too high, voids and the like are generated in the resulting fiber-reinforced composite material, and the mechanical properties may be deteriorated. When the fiber content is too low, the reinforcing effect of the fiber is insufficient, and the mechanical properties relative to mass may be substantially low.

(2) Thermoplastic Resin Composition

The thermoplastic resin composition included in the thermoplastic resin prepreg of the present invention contains 50 [mass %] or more of polyether ether ketone. In addition, the sum of the crystallinity $W_C$ [%] of the thermoplastic resin composition and the rigid amorphous component proportion $W_{RAP}$ [%] in a state of the thermoplastic resin prepreg is in a range of 51 to 100 [%].

The thermoplastic resin composition included in the thermoplastic resin prepreg of the present invention contains polyether ether ketone as an essential component, and may contain another thermoplastic resin, a filler, a pigment, or the like as necessary. Usually, a thermosetting resin is not contained.

The polyether ether ketone has a structural unit represented by the following Chemical Formula (1).

[Chem. 1]

Chem. 1

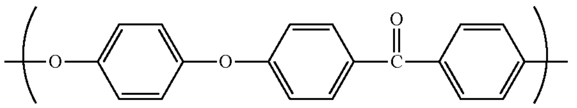

As such polyether ether ketone, a commercially available product can be used, and examples thereof include "Vesta-Keep" (trade name) manufactured by Daicel-Evonik Ltd., and "450G" (trade name) manufactured by Victrex plc. One type of these materials may be used alone or two or more types of these materials may be used in combination.

The proportion of the structural unit represented by Chemical Formula (1) in the polyether ether ketone is preferably 70 to 100 [mass %], more preferably 80 to 100 [mass %], and particularly preferably 90 to 100 [mass %].

The proportion of the polyether ether ketone in the thermoplastic resin composition is 50 [mass %] or more, preferably 60 to 100 [mass %], and particularly preferably 80 to 100 [mass %]. When the proportion is less than 50 [mass %], the heat resistance of a fiber-reinforced composite material obtained by molding the prepreg tends to be low.

The polyether ether ketone preferably has a crystal melting peak temperature as measured by a differential scanning calorimeter (DSC) of 300 [° C.] or higher from the viewpoint of heat resistance, and more preferably 320 [° C.] or higher.

The thermoplastic resin to be blended other than the polyether ether ketone is not particularly limited. Specific examples thereof include polyolefin-based resins such as polyethylene and polypropylene; polystyrene-based resins such as polystyrene, ABS, and AS; polyester-based resins such as polyethylene terephthalate (PET) and polybutylene terephthalate (PBT); polyamide resins such as nylon 6 (polycaproamide), nylon 66 (polyhexamethylene adipamide), and nylon 12 (polydodecanamide); a polycarbonate (PC) resin; a polyphenylene sulfide (PPS) resin; a polyethersulfone (PES) resin; a polyketone resin; polyaryletherketone resins such as polyetherketone (PEK) and polyetherketoneketone (PEKK); a polyimide (PI) resin; a polyamideimide (PAI) resin; and a fluororesin. In particular, a polyetherketoneketone (PEKK) resin is preferable. Two or more types of these thermoplastic resins may be contained.

The melting point of the thermoplastic resin composition is preferably 200 [° C.] or higher, more preferably 250 [° C.] or higher, still more preferably 280 [° C.] or higher, and particularly preferably 300 [° C.] or higher. The upper limit of the melting point is preferably 450 [° C.] or lower, more preferably 400 [° C.] or lower, and particularly preferably 350 [° C.] or lower. When the melting point of the thermoplastic resin composition is within this range, a prepreg having excellent moldability can be formed. When the melting point of the thermoplastic resin composition is too high, the thermoplastic resin included in the prepreg, an additive contained therein, or the like may cause thermal decomposition, leading to deterioration in the physical properties of the resulting fiber-reinforced composite material.

The thermoplastic resin prepreg of the present invention described above can be manufactured by a known method. Specific examples thereof include a method in which a fiber-reinforced substrate is thermally fused to a film made of a thermoplastic resin composition (hot-melt method); a method in which a fiber-reinforced substrate is immersed in a solution or an emulsion of a thermoplastic resin, dried and then melted; a method in which a fiber-reinforced substrate is allowed to pass through the inside of a bed of a thermoplastic resin powder to adhere the powder thereto, followed by heating and fusion; and a method in which a fiber-reinforced substrate is immersed in a suspension solution (suspended solution) of a thermoplastic resin powder to adhere the thermoplastic resin powder to the substrate, followed by heating and melting (powder suspension method). Among them, a powder suspension method is preferable because the inside of the reinforcing fiber can be uniformly impregnated with the thermoplastic resin.

The thermoplastic resin prepreg of the present invention can be preferably manufactured by the method described below.

2. Method for Manufacturing Thermoplastic Resin Prepreg

The method for manufacturing a thermoplastic resin prepreg of the present invention includes a step of heating at a heat treatment temperature equal to or higher than a glass transition temperature of the thermoplastic resin composition and then cooling to the glass transition temperature or lower in a state in which the thermoplastic resin composition is impregnated into the fiber-reinforced substrate or when the thermoplastic resin composition is impregnated into the fiber-reinforced substrate, wherein an average cooling rate during the cooling satisfies Condition (A) or (B) below.

Condition (A): In a case of (the heat treatment temperature)<(the glass transition temperature+150 [° C.]), the average cooling rate from the heat treatment temperature to the glass transition temperature is 80 [° C./sec] or less.

Condition (B): In a case of (the heat treatment temperature)>(the glass transition temperature+150 [° C.]), the average cooling rate from (the glass transition temperature+150 [° C.]) to the glass transition temperature is 80 [° C./sec] or less.

This manufacturing method is suitable for manufacturing the prepreg of the present invention described above.

Hereinafter, the method for manufacturing a thermoplastic resin prepreg will be described in detail.

The fiber-reinforced substrate is as described above.

The thermoplastic resin composition is not particularly limited. Specific examples thereof include polyolefin-based resins such as polyethylene and polypropylene; polystyrene-based resins such as polystyrene, ABS, and AS; polyester-based resins such as polyethylene terephthalate (PET) and polybutylene terephthalate (PBT); polyamide resins such as nylon 6 (polycaproamide), nylon 66 (polyhexamethylene adipamide), and nylon 12 (polydodecanamide); a polycarbonate (PC) resin; a polyphenylene sulfide (PPS) resin; a polyethersulfone (PES) resin; a polyketone resin; a polyetherketone (PEK) resin; a polyetherketoneketone (PEKK) resin; a polyether ether ketone (PEEK) resin; a polyimide (PI) resin; a polyamideimide (PAI) resin; and a fluororesin. In particular, a polyether ether ketone (PEEK) resin is preferable. Two or more types of these thermoplastic resins may be contained.

The melting point of the thermoplastic resin composition is preferably 200 [° C.] or higher, more preferably 250 [° C.] or higher, still more preferably 280 [° C.] or higher, and particularly preferably 300 [° C.] or higher. The upper limit of the melting point is preferably 450 [° C.] or lower, more preferably 400 [° C.] or lower, and particularly preferably 350 [° C.] or lower. When the melting point of the thermoplastic resin composition is within this range, a prepreg having excellent moldability can be formed. When the melting point of the thermoplastic resin composition is too high, the thermoplastic resin included in the prepreg, an additive contained therein, or the like may cause thermal decomposition, leading to deterioration in the physical properties of the resulting fiber-reinforced composite material.

The thermoplastic resin composition preferably contains the above-mentioned polyether ether ketone in an amount of 50 [mass %] or more, preferably 60 to 100 [mass %], and preferably 80 to 100 [mass %]. When the proportion is less than 50 [mass %], the heat resistance of a fiber-reinforced composite material obtained by molding the prepreg tends to be low.

When a hot-melt method is used, the method for forming the thermoplastic resin composition into a resin composition film is not particularly limited, and any conventionally known method can be used. Specifically, a resin composition film can be obtained by flow-casting or casting the resin composition on a support such as a release paper or a film using die extrusion, an applicator, a reverse roll coater, a comma coater, or the like. The resin temperature in producing the film is appropriately determined according to the formulation and viscosity of the resin composition. The heat fusion of the resin composition to the fiber-reinforced substrate and the impregnation into the fiber layer may be performed once or in multiple times.

In the powder suspension method, the thermoplastic resin composition in a powder form is used. In consideration of good deposition on the fiber-reinforced substrate (a state in which the resin powder is held between fibers or on the fiber surface), the particle diameter of the thermoplastic resin powder is 50 [μm] or less, and from the viewpoint of handleability, the particle diameter is preferably not less than 1 [μm], and the average particle diameter is more preferably in a range of 5 to 50 [μm]. When the thermoplastic resin powder in the above-mentioned particle size range is dispersed in a liquid described below, the dispersibility of the powder (the dispersibility of the resin powder in the suspension) is stable, and the resin powder can be stably deposited on the fiber-reinforced substrate even in long-term production. The average particle diameter means a value of a cumulative 50 vol % particle diameter (D50) in a particle size distribution measured using a laser diffraction/scattering method.

In the powder suspension method, it is preferable to use a liquid for dispersing the thermoplastic resin powder. As the liquid to be used, one type or two or more types of solvents selected from water, alcohols, ketones, and halogenated hydrocarbons, or a mixed solvent is preferable. Examples of the alcohols include methanol, ethanol, isopropyl alcohol, and methyl cellosolve, examples of the ketones include acetone and methyl ethyl ketone, and examples of halogenated hydrocarbons include methylene chloride and dichloroethane. Among them, ethanol, isopropyl alcohol, acetone, or a mixed solvent thereof and water, or water is preferable. In addition, a commercially available product containing the above-mentioned solvent and having a suitable solvent composition can also be used, and examples of such a commercially available product include SOLMIX (product name, manufactured by Japan Alcohol Trading CO., LTD.). Such a liquid also has an effect of moderately opening the fiber-reinforced substrate, and thus is effective in uniformly depositing the resin powder in the suspension on the fiber material.

In the combination of the thermoplastic resin powder and the liquid (solvent) for dispersing the thermoplastic resin powder, it is preferable that the solvent is a poor solvent for the thermoplastic resin, and it is preferable that the resin is not dissolved therein.

The concentration of the thermoplastic resin in the suspension [the mass of thermoplastic resin/(the mass of liquid+the mass of thermoplastic resin)×100] is preferably 1 to 50 [mass %], more preferably 1 to 30 [mass %], and still more preferably 1 to 15 [mass %].

The temperature of the suspension when the fiber-reinforced substrate is immersed is not particularly limited as long as the dispersion state of the resin is kept good, and varies depending on the type and concentration of the thermoplastic resin or the liquid to be used, but is usually 5 to 50 [° C.], preferably 5 to 30 [° C.], and more preferably 15 to 30 [° C.].

The amount of the thermoplastic resin powder to be adhered to the fiber-reinforced substrate is preferably 10 to 70 [mass %] with respect to the total amount of the fiber-reinforced substrate and the thermoplastic resin powder, and more preferably 20 to 50 [mass %] from the viewpoint of manufacturing the prepreg.

The fiber-reinforced substrate to which the thermoplastic resin powder is adhered in this manner is usually dried at a temperature at which the thermoplastic resin does not decompose or react. The drying temperature is preferably 80 to 200 [° C.], and the drying time is preferably 1 to 20 [min] in terms of manufacturing.

The fiber-reinforced substrate to which the thermoplastic resin powder is adhered is heated under pressure at a temperature equal to or higher than the melting point of the crystalline thermoplastic resin contained in the thermoplastic resin composition. By this heat treatment, the thermoplastic resin powder is softened or melted, and the fiber-reinforced substrate and the thermoplastic resin composition are integrated into a thermoplastic resin prepreg in a heated state. Subsequently, the thermoplastic resin prepreg in the heated state is cooled to a temperature equal to or lower than the glass transition temperature of the thermoplastic resin composition. This cooling is characterized in that the average cooling rate satisfies Condition (A) or (B) below.

Condition (A): In a case of (the heat treatment temperature)<(the glass transition temperature+150 [° C.]), the average cooling rate from the heat treatment temperature to the glass transition temperature is 80 [° C./sec] or less.

Condition (B): In a case of (the heat treatment temperature)>(the glass transition temperature+150 [° C.]), the average cooling rate from (the glass transition temperature+150 [° C.]) to the glass transition temperature is 80 [° C./sec] or less.

The average cooling rate is preferably 50 [° C./sec] or less, more preferably 30 [° C./sec] or less, and particularly preferably 10 [° C./sec] or less in each condition. By setting the average cooling rate within this range, the crystallinity or the like of the thermoplastic resin tends to fall within an appropriate range, so that it is possible to obtain a prepreg which has high surface smoothness and is less likely to be deformed or wrinkled during thermal processing.

When the average cooling rate is more than 80 [° C./sec], the proportion of the amorphous portion in the thermoplastic resin increases, and wrinkles may be likely to occur due to the influence of change in volume by recrystallization of the amorphous portion.

By the above-mentioned method, the thermoplastic resin prepreg of the present invention is obtained. In this manufacturing method, the thermoplastic resin composition is impregnated into the fiber-reinforced substrate, and also heating under pressure is performed, but the manufacturing method is not limited thereto, and the thermoplastic resin prepreg in which the thermoplastic resin composition is impregnated in advance into the fiber-reinforced substrate may be heated under pressure again. When the thermoplastic resin prepreg is heated to a temperature equal to or higher than the glass transition point a plurality of times during the manufacturing, the above-mentioned conditions are applied during the final cooling.

The temperature in the case of performing heating under pressure again is equal to or higher than the glass transition point of the thermoplastic resin composition. The temperature when the temperature during heating under pressure is equal to or higher than the glass transition point and lower than the melting point is preferably higher than the glass transition point by 20 [° C.] or more, and more preferably by 30 [° C.] or more. When the temperature during heating under pressure is equal to or higher than the melting point, the temperature is preferably higher than the melting point by 20 [° C.] or more, and more preferably by 30 [° C.] or more. By heating to the above-mentioned temperature, the rigid amorphous component proportion and the crystallinity of the thermoplastic resin composition can be controlled within the desired ranges. As an example, in a case where a polyether ether ketone (PEEK) resin is used as the thermoplastic resin, the heating temperature is preferably 160 to 330 [° C.], and more preferably 170 to 320 [° C.] when the heating temperature is lower than the melting point. When the heating temperature is equal to or higher than the melting point, the heating temperature is preferably 360 to 450 [° C.], and more preferably 370 to 450 [° C.].

The time for holding the thermoplastic resin composition at the glass transition point or higher is not particularly limited, but when the temperature during heating under pressure is lower than the melting point, the holding time at the glass transition point or higher is preferably 10 to 1,800 [sec], and more preferably 10 to 1,500 [sec]. When the temperature during heating under pressure is the melting point or higher, the holding time at the melting point or higher is preferably 10 to 600 [sec], and more preferably 10 to 300 [sec].

The surface pressure during heating under pressure is not particularly limited, but is preferably 0.1 to 10 [MPa], and more preferably 0.5 to 7.5 [MPa]. Pressurization at 0.1 [MPa] or more under heating to the glass transition point or higher increases the surface smoothness of the thermoplastic resin prepreg. When the surface pressure is too high, the surface smoothness immediately after heating under pressure is high, but wrinkles may occur during thermal processing of the thermoplastic resin prepreg. In addition, as a result of hindering movement of the fiber or the resin in the prepreg, the internal stress is not sufficiently relaxed, and wrinkles may be likely to occur during thermal processing of the thermoplastic resin prepreg. When the surface pressure is within the above-mentioned range, the surface smoothness of the thermoplastic resin prepreg is high, and deformation and wrinkles during thermal processing of the thermoplastic resin prepreg are less likely to occur.

The end temperature of the cooling under pressure is equal to or lower than the glass transition temperature of the crystalline thermoplastic resin contained in the thermoplastic resin composition. Cooling to the glass transition temperature or lower under pressure can increase the surface smoothness of the thermoplastic resin prepreg. As an example, when a polyether ether ketone (PEEK) resin is used as the thermoplastic resin, the cooling end temperature is preferably 140 [° C.] or lower, and more preferably 135 [° C.] or lower.

The surface pressure during cooling under pressure is preferably 0.1 to 10 [MPa], and more preferably 0.5 to 7.5 [MPa]. When pressurization is performed at 0.1 [MPa] or more during cooling, the surface smoothness of the thermoplastic resin prepreg is high, and deformation and wrinkles during thermal processing of the thermoplastic resin prepreg are less likely to occur.

A device used for heating under pressure and cooling under pressure of the fiber-reinforced substrate to which the thermoplastic resin powder is adhered is not particularly limited, and a heating roller, a heat press device, a double belt press device, or the like can be used. In particular, a double belt press device is preferable because it can pressurize the prepreg while the prepreg is conveyed with upper and lower endless belts, and is suitable for continuous production.

EXAMPLES

Hereinafter, the present invention will be specifically described with reference to examples and comparative examples. A laminate test, a wrinkle test, and measurement of a crystallinity and a rigid amorphous component proportion in each of examples and comparative examples were performed by the following methods.

[Evaluation of Wrinkles]

The presence or absence of wrinkles immediately after manufacturing of the thermoplastic resin prepreg of the present invention was visually evaluated. Further, the thermoplastic resin prepreg was heated at 385 [° C.] for 5 [min] and then further heated at 200 [° C.] for 5 [min], and then the presence or absence of wrinkles was visually evaluated. The evaluation criteria are as follows.

○: The appearance is extremely good. The uniformity of the surface of the prepreg and the linearity of the fiber are ensured, and waviness due to thermal shrinkage does not occur in the prepreg.

Δ: The appearance is good. The uniformity of the surface of the prepreg and the linearity of the fiber are ensured, and slight waviness due to thermal shrinkage occurred in the prepreg. There is no problem to use in appearance.

x: The appearance is poor. Waviness occurred in the prepreg, the linearity of the fiber was lost, and wrinkles occurred.

[Laminate Test]

Twenty four prepregs were laminated and heated at 380 [° C.] and 0.1 [MPa] for 60 [min]. The cross section of the obtained laminated body was photographed, and the void fraction (area %) was calculated by image processing.

[Crystallinity]

The crystallinity We of the thermoplastic resin composition was obtained by converting two-dimensional data obtained by wide-angle X-ray diffraction measurement into a 20 profile, subtracting the CF component to perform baseline correction, and then performing peak fitting in a range of 20=7 to 36°. The crystallinity was determined according to the following formula from the integrated intensities Ic and Ia of the respective peaks.

$$W_C = \frac{I_c}{I_c + I_a}$$

$W_C$: a crystallinity [%]

Ic: an integrated intensity of a crystalline component

Ia: an integrated intensity of an amorphous component

In addition, the measurement conditions are as follows.

Measuring device: Nano-Viewer (manufactured by Rigaku Corporation)

Generator: UltraX 18

Tube voltage/tube current: 45 kV/60 mA

Target: CuKα (λ=0.1542 nm)

Camera length: 56.6 mm

Measurement time: 3 min×3 sheets

Measurement temperature: room temperature

Detector: PILATUS-100K

[Rigid Amorphous Component Proportion]

The rigid amorphous component proportion $W_{RAP}$ is a value obtained by subtracting the crystallinity $W_C$ [%] and a complete amorphous component proportion $W_{MA}$ [%] from 100 [%], and was calculated by the following mathematical formula (1).

$$W_{RAP} = 100 - W_{MA} - W_C \quad \text{Math. (1)}$$

The amorphous component proportion $W_{MA}$ [%] is a value obtained by dividing the amount of change ΔCp in heat capacity of the entire thermoplastic resin composition at the glass transition temperature by 0.27 J/(g·K), which is the amount of change in heat capacity when polyether ether ketone is 100% completely amorphous, and is represented by the following mathematical formula (2).

$$W_{MA}=100\times\Delta Cp/0.27 \quad \text{Math. (2)}$$

The amount of change ΔCp in heat capacity of the entire thermoplastic resin composition at the glass transition temperature was measured as follows.

[Measurement Method for Amount of Change ΔCp in Heat Capacity]

The amount of change ΔCp in heat capacity of the entire thermoplastic resin composition was determined by performing measurement in a temperature modulation mode using a differential scanning calorimeter DSC and performing calculation by the following calculation method.

A direct function F(T) of Reversing Cp of a tangent before glass transition and a direct function G(T) of a tangent after glass transition were each extrapolated, and F(Tg)−G(Tg) obtained by substituting T=Tg as a representative of the glass transition temperature (Tg) at the midpoint was defined as an amount of change ΔCp' in heat capacity of the prepreg. The amount of change ΔCp in heat capacity of the thermoplastic resin composition was calculated by dividing ΔCp' by the weight fraction of the thermoplastic resin in the prepreg.

In addition, the measurement conditions are as follows.

Measuring apparatus: a differential scanning calorimeter Q200 manufactured by TA Instruments, Inc.

Sample purge gas: He, 25 ml/min

Sample pan: T-Zero pan made of aluminum

Mass of sample: 10 mg

Temperature rise conditions: a temperature range of 50 to 200° C., an average temperature rise rate of 2° C./min, a temperature modulation amplitude of ±1° C./120 sec.

As raw materials of the prepreg, the following materials were used.

[Thermoplastic Resin Particles]

PEEK: VESTAKEEP 2000G (trade name) (polyether ether ketone, manufactured by Daicel-Evonik Ltd., glass transition temperature: 143° C., melting point: about 340° C., average particle diameter (D50): 20 μm)

[Reinforcing Fiber Bundle]

"Tenax" (trade name) IMS65 P12 24K (carbon fiber strand, manufactured by TEIJIN LIMITED, number of filaments: 24,000)

Examples 1 and 2

Reinforcing fiber bundles were aligned in one direction to obtain a fiber-reinforced substrate having a fiber basis weight of 190 g/mm$^2$. In addition, thermoplastic resin particles were dispersed in ethanol to prepare a suspension solution having a concentration of 5.5 mass %.

Subsequently, the fiber-reinforced substrate was immersed in the suspension solution for 15 seconds to adhere the thermoplastic resin particles to the fiber-reinforced substrate. The obtained fiber-reinforced substrate with the resin was dried in a drying furnace at 100° C. for 1 minute, and then a plurality of heating bars at 400° C. were allowed to pass therethrough to melt and impregnate the thermoplastic resin, thereby producing a unidirectional thermoplastic resin prepreg (primary prepreg). The average cooling rate from the glass transition temperature+150° C. (that is, 293° C.) to the glass transition temperature (that is, 143° C.) was 84° C./sec. The content of carbon fibers in the entire prepreg was 57 [vol %].

The thermoplastic resin prepreg (primary prepreg) was heated under pressure again to a temperature equal to or higher than the glass transition temperature, and then cooled under pressure using a double belt press device (a hydraulic double belt press device, manufactured by Morita Giken Co., Ltd.) to obtain a thermoplastic resin prepreg (a prepreg of the present invention) (a reheating under pressure treatment of the primary prepreg).

In the double belt press device, a preheating roller, two heating rollers, three cooling rollers, and a residual heat roller were provided in this order from the prepreg charging port, and pressure was applied by heating roller and cooling roller parts. The maximum reached temperature of the heating roller part and the temperature at the outlet of the cooling roller part were defined as a heating temperature and a cooling temperature, respectively, and were set as shown in Table 1. The set pressures of the heating roller and cooling roller parts and the average cooling rate from the heating temperature to the glass transition temperature were set as shown in Table 1.

Example 3

A thermoplastic resin prepreg was produced in the same manner as in Example 1 except that in the step of cooling the primary prepreg, the average cooling rate from the glass transition temperature+150° C. to the glass transition temperature was set to 23° C./sec, and the obtained primary prepreg was not subjected to the reheating under pressure treatment.

Example 4

A thermoplastic resin prepreg (primary prepreg) was produced in the same manner as in Example 1, and then subjected to a heating under pressure treatment again using a heat press to obtain a thermoplastic resin prepreg. The heating temperature using the heat press, the cooling temperature, and the average cooling rate from the heating temperature to the glass transition temperature were set as shown in Table 1.

Comparative Examples 1 and 2

A thermoplastic resin prepreg (primary prepreg) was produced in the same manner as in Example 1. The obtained prepreg was not subjected to the reheating under pressure treatment.

TABLE 1

| | Matrix resin | | Base TPUD production condition | | Post-treatment | | | | | |
|---|---|---|---|---|---|---|---|---|---|---|
| | Type of resin | Tg [° C.] | Heating temperature [° C.] | Average cooling rate (Tg + 150 to Tg) [° C./sec] | Treatment method | Heating temperature [° C.] | Cooling temperature [° C.] | Average cooling rate [° C./sec] | Pressure [MPa] | Temperature drop condition Pattern |
| Example 1 | PEEK | 143 | 400 | 84 | Double belt press | 390 | 140 | 2.2 | 5 | (B) |
| Example 2 | PEEK | 143 | 400 | 84 | Double belt press | 450 | 100 | 1.9 | 2 | (B) |
| Example 3 | PEEK | 143 | 400 | 23 | — | — | — | — | — | (B) |
| Example 4 | PEEK | 143 | 400 | 84 | Heat press | 250 | 50 | 0.25 | 1 | (A) |
| Comp. Example 1 | PEEK | 143 | 400 | 84 | — | — | — | — | — | (B) |
| Comp. Example 2 | PEEK | 143 | 400 | 84 | — | — | — | — | — | (B) |

| | Temperature | Evaluation results | | | | | |
|---|---|---|---|---|---|---|---|
| | drop condition Average ocoling rate [° C./sec] | Wrinkle test (appearance) | Laminate test (void fraction) [%] | Crystallinity $W_C$ [%] | Mobile amorphous proportion $W_{MA}$ [%] | Rigid arrorphous component proportion $W_{RAP}$ [%] | Rigid component proportion $W_R = W_{RAP} + W_C$ [%] |
| Example 1 | 2.2 | Δ | 2.5 | 22.0 | 17.0 | 61.0 | 83 |
| Example 2 | 1.9 | ○ | 0.2 | 23.8 | 10.6 | 65.6 | 89 |
| Example 3 | 23 | Δ | 0.5 | 26.4 | 45.3 | 28.3 | 55 |
| Example 4 | 0.25 | Δ | 3.7 | 33.3 | 6.4 | 60.3 | 94 |
| Comp. Example 1 | 84 | x | 9.7 | 18.2 | 50.5 | 31.3 | 50 |
| Comp. Example 2 | 84 | x | 10 | 23.0 | 56.1 | 20.9 | 44 |

The prepregs of two comparative examples are from different lots.

As shown in Table 1, the thermoplastic resin prepregs of Examples 1 to 4 had no problems with appearance in the wrinkle test and the laminate test, and also had a low void fraction in the laminate test. Meanwhile, in the thermoplastic resin prepregs of Comparative Examples 1 and 2, the average cooling rate in the prepreg production step was high, and the subsequent heating under pressure and cooling under pressure were not performed, and therefore, the rigid component proportion was low, a problem occurred in the appearance in the wrinkle test and the laminate test, and the void fraction in the laminate test was also high.

The invention claimed is:

1. A thermoplastic resin prepreg comprising a fiber-reinforced substrate and a thermoplastic resin composition partially or completely impregnated into the fiber-reinforced substrate, wherein the content of the fiber-reinforced substrate in the entire thermoplastic resin prepreg is 40 to 85 [mass %], the thermoplastic resin composition contains 50 [mass %] or more of polyether ether ketone among all thermoplastic resins contained in the thermoplastic resin composition, and a sum ($W_C$+$W_{RAP}$) of a crystallinity $W_C$ [%] of the thermoplastic resin composition and a rigid amorphous component proportion $W_{RAP}$ [%] in the thermoplastic resin composition is in a range of 51 to 100 [%].

2. The thermoplastic resin prepreg according to claim 1, wherein the crystallinity $W_C$ is 20 to 50 [%].

3. The thermoplastic resin prepreg according to claim 1, wherein the rigid amorphous component proportion $W_{RAP}$ is 25 to 80 [%].

4. The thermoplastic resin prepreg according to claim 1, wherein a void fraction in a laminate test is 9.5 [area %] or less.

5. The thermoplastic resin prepreg according to claim 1, wherein the fiber-reinforced substrate includes a carbon fiber.

6. A method for manufacturing a thermoplastic resin prepreg, which includes a fiber-reinforced substrate and a thermoplastic resin composition containing a crystalline thermoplastic resin, and in which the thermoplastic resin composition is partially or completely impregnated into the fiber-reinforced substrate, wherein the content of the fiber-reinforced substrate in the entire thermoplastic resin prepreg is 40 to 85 [mass %], the method comprising a step of heating at a heat treatment temperature equal to or higher than a glass transition temperature of the thermoplastic resin composition and then cooling to the glass transition temperature or lower in a state in which the thermoplastic resin composition is impregnated into the fiber-reinforced substrate or when the thermoplastic resin composition is impregnated into the fiber-reinforced substrate, wherein an average cooling rate during the cooling satisfies Condition (A) or (B) below:

Condition (A): in a case of (the heat treatment temperature)<(the glass transition temperature+150 [° C.]), the average cooling rate from the heat treatment temperature to the glass transition temperature is 80 [° C./sec] or less; or Condition (B): in a case of (the heat treatment temperature)>(the glass transition temperature+150 [° C.]), the average cooling rate from (the glass transition temperature+150 [° C.]) to the glass transition temperature is 80 [° C./sec] or less.

7. The method for manufacturing a thermoplastic resin prepreg according to claim 6, wherein the heat treatment temperature is equal to or higher than a melting point of the crystalline thermoplastic resin.

8. The method for manufacturing a thermoplastic resin prepreg according to claim 7, wherein heating under pressure and cooling under pressure are performed at a surface pressure of 0.1 to 10 [MPa] during the heating and during the cooling.

9. The method for manufacturing a thermoplastic resin prepreg according to claim 8, wherein the heating under pressure and the cooling under pressure are performed using a double belt press device.

10. The method for manufacturing a thermoplastic resin prepreg according to claim 6, wherein heating under pressure and cooling under pressure are performed at a surface pressure of 0.1 to 10 [MPa] during the heating and during the cooling.

11. The method for manufacturing a thermoplastic resin prepreg according to claim 10, wherein the heating under pressure and the cooling under pressure are performed using a double belt press device.

12. The method for manufacturing a thermoplastic resin prepreg according to claim 6, wherein the crystalline thermoplastic resin is polyether ether ketone.

13. The method for manufacturing a thermoplastic resin prepreg according to claim 6, wherein the fiber-reinforced substrate includes a carbon fiber.

* * * * *